(12) United States Patent  
Bayani

(10) Patent No.: US 9,250,918 B2  
(45) Date of Patent: Feb. 2, 2016

(54) SERVER MANAGEMENT WITH DYNAMIC CONSTRUCTION OF PRE-BOOT IMAGES

(75) Inventor: Samir Bayani, Maharahstra (IN)

(73) Assignee: BMC SOFTWARE, INC., Houston, TX (US)

(*) Notice: Subject to any disclaimer, the term of this patent is extended or adjusted under 35 U.S.C. 154(b) by 670 days.

(21) Appl. No.: 13/174,668

(22) Filed: Jun. 30, 2011

(65) Prior Publication Data

US 2013/0007435 A1    Jan. 3, 2013

(51) Int. Cl.
  *G06F 9/44* (2006.01)
  *G06F 15/177* (2006.01)

(52) U.S. Cl.
  CPC ............. *G06F 9/4401* (2013.01); *G06F 9/4416* (2013.01); *G06F 15/177* (2013.01)

(58) Field of Classification Search
  CPC ....... G06F 9/44; G06F 9/4401; G06F 9/4416; G06F 15/177
  USPC ......................................................... 713/1, 2
  See application file for complete search history.

(56) References Cited

U.S. PATENT DOCUMENTS

| | | | |
|---|---|---|---|
| 7,356,679 B1* | 4/2008 | Le et al. ............................. | 713/1 |
| 7,565,517 B1* | 7/2009 | Arbon ............................... | 713/1 |
| 7,882,345 B1* | 2/2011 | Christensen ........................ | 713/2 |
| 2003/0126202 A1* | 7/2003 | Watt ....................... | G06F 9/4401 709/203 |
| 2004/0128495 A1* | 7/2004 | Hensley ................ | G06F 9/4406 713/2 |
| 2005/0132360 A1* | 6/2005 | Chu et al. ........................ | 717/177 |
| 2006/0173912 A1* | 8/2006 | Lindvall et al. ............. | 707/104.1 |
| 2007/0198819 A1* | 8/2007 | Dickens et al. .................... | 713/1 |
| 2008/0148031 A1* | 6/2008 | Brown et al. ..................... | 713/1 |
| 2008/0244028 A1* | 10/2008 | Le ........................... | G06F 3/0607 709/208 |
| 2012/0110312 A1* | 5/2012 | Domsch et al. .................... | 713/2 |

OTHER PUBLICATIONS

"How to Perform a Network Capture of a Server Operating System Image That is Configured with Sysprep and PXE", retrieved from: http://technet.microsoft.com/en-us/library/bb892804(d=printer).aspx, Nov. 18, 2007, 3 pages.

* cited by examiner

*Primary Examiner* — Jaweed A Abbaszadeh
*Assistant Examiner* — Terrell Johnson
(74) *Attorney, Agent, or Firm* — Brake Hughes Bellermann LLP

(57) ABSTRACT

A request handler may receive an image capture request for an operating system (OS) executing on a server. A pre-boot image handler may generate a pre-boot image, based on the image capture request and on the executing operating system. An image handler may capture an image of the operating system, based on the pre-boot image.

17 Claims, 4 Drawing Sheets

SERVER MANAGEMENT WITH DYNAMIC CONSTRUCTION OF PRE-BOOT IMAGES

TECHNICAL FIELD

This description relates to server management.

BACKGROUND

Conventional remote server management systems and techniques exist which enable system administrators and other authorized users to provision, configure, maintain, or otherwise manage a plurality of servers. For example, a business or other organization may deploy a relatively large number of servers to thereby provide a private intranet. In other examples, a provider may deploy a plurality of servers, which are then made available on an outsourced and/or as-needed basis to one or more customers. For example, in the latter examples, a business may not wish to maintain its own server infrastructure, and therefore may instead contract with a provider of server infrastructure to thereby obtain desired server resources.

In these and other relevant contexts, the various deployed servers may be large in number, and/or may be deployed in geographical locations which are remote from one another and/or from a system administrator of the deployed servers. Consequently, it may be prohibitively expensive or impossible for such system administrators to physically or personally be present at a physical location of a given server which may require service or other management functionality at a given point in time. Thus, as referenced above, various systems and techniques have been developed which enable remote, network-based server management, which therefore enables system administrators to manage a large number of deployed servers in a practical, cost-effective manner.

In particular, such remote server management may include the provisioning or re-provisioning of one or more servers of a plurality of remotely-managed servers. For example, such provisioning or re-provisioning may be implemented in the context of creating a plurality of clones or copies of a designated server, and/or in the context of migrating a designated server from a source platform to a destination or a target platform. For example, such migration and cloning may be implemented for the purpose of quickly and reliably creating similar or identical servers within the context of a plurality of deployed servers. In other examples, servers may be migrated for the purpose of utilizing different/better hardware platforms, and/or for taking advantage of server virtualization (e.g., for migrating a server from a physical server to a virtual server, or from a first virtual infrastructure to a second virtual infrastructure).

In order to implement the above and related functionalities, it is conventional to capture and otherwise utilize an image of the designated server that is to be migrated, cloned, or otherwise provisioned or re-provisioned. In such contexts, such a server image generally refers to one or more files and related data which include sufficient information describing an operating system (OS), application stack, configurations, and other characteristics of the imaged server to enable a reconstruction or re-instantiation of the designated server using a different server (or server platform).

In the above and other related contexts, such a server image may be captured through the use of well-known network-based boot techniques. For example, during normal startup operations, a given server may utilize a boot loader to implement local, predefined boot configuration settings, to thereby boot an installed operating system, and, thus, to thereby load or otherwise make available all installed applications, network connections, and any other available hardware or software which has been pre-designated for inclusion in the normal or default startup procedures of the server in question.

In order to capture a server image of such a server, a system administrator may circumvent the just-described startup procedures by preemptively executing a network boot of the server in question. Specifically, for example, the system administrator may utilize a management server to transmit a specialized file which itself provides an image of a boot execution environment. Inasmuch as this transmitted boot image file preempts the normal boot operations of the designated server, the transmitted image file may be referred to as a pre-boot image which thus defines a pre-boot execution environment. Generally, such a pre-boot image may include or represent a minimized or optimized version of the boot settings/configurations normally used to boot the designated server, along with relevant software which is used to capture the desired image of the designated server, for use thereof in the above-referenced migration, cloning, or other provisioning-related management functionalities. Known techniques exist for implementing the just-referenced pre-boot techniques over a network, including, e.g., the pre-boot execution environment (PXE) and associated pre-boot image transmitted using the trivial file transfer protocol (TFTP).

Thus, in the manner just described, a system administrator may execute a network-based boot of a designated server to be provisioned or re-provisioned, including the described utilization of a pre-boot image. Generally speaking, a size and content of each pre-boot image should be minimized as much as reasonably possible, so as, for example, to conserve valuable network resources, e.g., bandwidth and/or memory. For example, since the pre-boot image is generally only required to initiate a network boot process of an otherwise inactive server and associated operating system, and to thereafter capture the desired image of the server and associated operating system, a number of elements which might normally be used during a typical, local boot process may be reduced or omitted. Instead, only such elements as may be particularly necessary for accomplishing the above-described goals may be included in the pre-boot image (e.g., certain boot-critical drivers, or certain configuration settings necessary for initiating a boot process). Moreover, inclusion of such elements may be specific to (and therefore optimized for) a type of hardware and/or software platform associated with the designated server (e.g., certain server manufacturers may require different boot-critical drivers relative to one another). Thus, using these and other related techniques, pre-boot images may be minimized or otherwise optimized for executing a network boot of a particular, designated server.

However, in many cases a system administrator may be responsible for provisioning or re-provisioning a large number of servers, which may vary widely with respect to one another in terms of available hardware/software platforms. Consequently, in order to utilize minimized/optimized pre-boot images in the manner just described, the system administrator may be required to store or otherwise access a correspondingly large number of pre-boot images which are specific to the servers which the system administrator may be required to manage.

Maintaining such a large library of pre-boot images may be cumbersome, time-consuming, or otherwise inefficient for the system administrator, particularly in cases where the servers managed by the system administrator may change over time in type and/or number, and/or in cases where various ones of the pre-boot images may need to be updated over time. Moreover, other difficulties may arise; for example, since the pre-boot images are essentially static images, it may be difficult for the system administrator to consider or otherwise manage aspects of the various-managed servers which may vary in time and/or which may be unique to a given server. For example, it may be difficult for the system administrator to manage boot-related issues associated with a network connectivity of a given server, such as, for example, a network address of the server. Thus, for the above and other reasons, it may be difficult or inefficient for a system administrator to manage a relatively large number of remote, heterogeneous servers.

SUMMARY

According to one general aspect, a computer system may include instructions recorded on a computer-readable medium and executable by at least one processor. The system may include a request handler configured to receive an image capture request for an operating system (OS) executing on a server. The system may include a pre-boot image handler configured to generate a pre-boot image, based on the image capture request and on the executing operating system. The system may include an image handler configured to capture an image of the operating system, based on the pre-boot image.

According to another general aspect, a computer-implemented method may include receiving an image capture request for an operating system (OS) executing on a server, generating a pre-boot image, based on the image capture request and on the executing operating system, and capturing an image of the operating system, based on the pre-boot image.

According to another general aspect, a computer program product may be tangibly embodied on a computer-readable medium and may include instructions that, when executed, are configured to receive an image capture request for an operating system (OS) executing on a server, generate a pre-boot image, based on the image capture request and on the executing operating system, and capture an image of the operating system, based on the pre-boot image.

The details of one or more implementations are set forth in the accompanying drawings and the description below. Other features will be apparent from the description and drawings, and from the claims.

DETAILED DESCRIPTION

Figure 1:
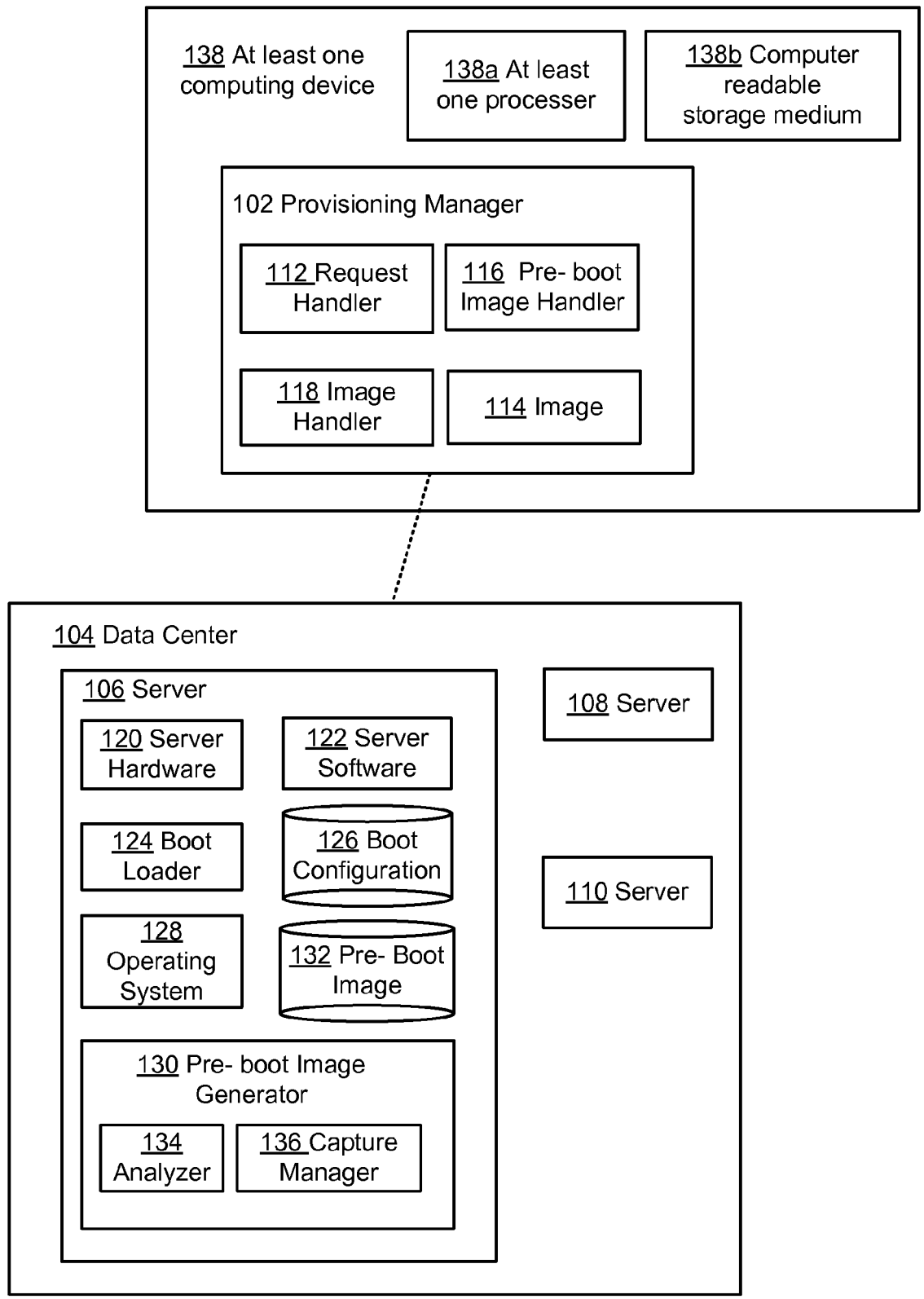
FIG. 1 is a block diagram of a system for dynamic construction of pre-boot images used for remote server management.

FIG. 1 is a block diagram of a system 100 for providing dynamic construction of pre-boot images used in remote server management. In the example of FIG. 1, as described in detail below, such pre-boot images may be generated on an as-needed basis, in response to a particular request for an image of a designated server, and may be customized/optimized relative to the designated server. In this way, it is not necessary for the system administrator to maintain a library of such pre-boot images. Consequently, among other advantages as described herein, the system administrator may be enabled to perform a faster, more efficient management of server resources.

In the example of FIG. 1, a provisioning manager 102 is illustrated that might be used by a system administrator to manage a data center 104 which includes a plurality of servers 106, 108, 110. In the example, the provisioning manager 102 is illustrated as communicating remotely with the data center 104 (and servers located therein), and the data center 104 is illustrated as including a minimal number of servers 106, 108, 110. Of course, in practice and as referenced above, the data center 104 may include a relatively large number of servers, and the provisioning manager 102 may be implemented locally at the data center 104, and/or may manage one or more other data centers and associated servers (not explicitly illustrated in FIG. 1), in addition to the data center 104 itself.

As described above, and as is well known, the system administrator of the system 100 may be required to provision or re-provision one or more of the servers 106, 108, 110. For example, the system administrator may be required to re-provision a virtual server implemented at the server 106 for migration to a better hardware platform provided by the server 108. In another example, the system administrator may be required to clone the server 106 for similar or identical implementation thereof using the hardware/software platform of the server 110.

In order to provide these and related server management functionalities, it may be necessary or desirable for the system administrator to obtain an image of a designated server that is to be migrated, cloned, or otherwise provisioned/re-provisioned. As referenced above, and as is well known, such an image may simply be understood to include any and all such information which may be necessary or desirable for reconstructing the server in question in a different context, including, for example, images which include an operating system of the designated server and any application stack executing using the operating system, as well as various other configuration information characterizing the server in question. Consequently, such an image (or variations thereof) may be referred to by various known terminologies, e.g., as a server image, an operating system (OS) image, or various other known or apparent terminologies. Inasmuch as such server management techniques, including the utilization of such server or OS images, are well known in the art, the techniques are not described here in further detail, except as may be necessary or helpful in understanding operations of the system 100 of FIG. 1.

Thus, at a given point in time, a request handler 112 of the provisioning manager 102 may receive a request for an image capture of a server image of a designated server. For example, the request handler 112 may be associated with a graphical user interface (GUI), and the system administrator may select or otherwise identify the server 106 as a server for which an image is required to be captured, e.g., for subsequent migration or cloning thereof. Of course, in other examples, the request handler 112 may receive such a request in various other manners. For example, the request handler 112 may receive an automated request from an automated server management software application, or may receive the image capture request from the system administrator via some other known input technique in the use of a corresponding GUI. In this way, using the techniques described below, the provisioning manager 102 may ultimately obtain an image 114 of the server 106, for subsequent use in, e.g., migration or cloning of the server 106.

During the capture of the image 114, a pre-boot image handler 116 may be configured to instruct, or otherwise communicate with, one or more agents or modules executing at the designated server 106, so as to thereby cause the one or more agents or modules at the designated server 106 to dynamically construct a necessary pre-boot image. Through the use of such a dynamically pre-boot image constructed at the server 106, the one or more agents or modules at the designated server 106 may enable the capture of the image 114. An image handler 118 at the provisioning manager 102 may thus be configured to receive, store, transmit, or otherwise manage the image 114 during subsequent server management functionalities performed using the image 114.

Specifically, as referenced above, the designated server 106 may include specific server hardware 120 and associated server software (e.g., application stack) 122. In other words, the representation of the server hardware 120 and the server software 122 may be generally understood to illustrate the fact that the server 106 may have particular hardware/software requirements or other considerations, which may be different from similar requirements at either or both of the servers 108, 110. The server 106 also may include a boot loader 124 which may be configured to execute an otherwise conventional boot configuration 126, so as to thereby boot an operating system 128 (shown separately from server software 122 for convenience and for clarity of discussion of aspects of the operating system 128), and thereby make available to a user of the server 106 specific desired aspects of the server hardware 120 and/or the server software 122.

In the example of FIG. 1, the operating system 128 may include, for example, a Linux operating system, or variations thereof. For example, the OS 128 may include a Red Hat, CentOS, Oracle Enterprise Linux, SuSE Linux Enterprise Server operating system(s). In other implementations, the OS 128 may include a Berkley Software Distribution (BSD) or Berkley Unix operating system, or any variation of Unix which is amenable to the techniques described herein. Further, the system 100 of FIG. 1 may be utilized with other operating systems, not specifically mentioned herein, including future operating systems.

In the example of FIG. 1, a pre-boot image generator 130 represents the type of agents/modules which may be executing at the server 106, and which may be configured, based on instruction from the pre-boot image handler 116, to dynamically construct a pre-boot image 132 for storage at the designated server 106. Specifically, as described in detail herein, the pre-boot image generator 130 may include an analyzer 134 which may be configured to analyze, e.g., operations of a currently-active execution of the operating system 128, so as to thereby detect or otherwise determine various boot-critical drivers, configuration settings, network settings, or a number of other aspects of the executing operating system 128 which may be necessary or desirable for inclusion within the pre-boot image 132. At the same time, the pre-boot image generator 130 may include a capture manager 136 which may be configured to insert or include capture components within the pre-boot image 132, so that subsequent booting of the operating system 128 by the boot loader 124 based on the pre-boot image 132 will result in the desired capture of the image 114.

Thus, it may be appreciated that although a booting and subsequent image capture of the operating system 128 may be initiated by a network communication by the provisioning manager 102, the generation of the pre-boot image 132, and subsequent storage and usage thereof, occurs primarily or entirely at the designated server 106 (e.g., using the pre-boot image generator 130). Consequently, it may be appreciated that the pre-boot image 132 need not be stored in advance of the desired image capture operations, yet the pre-boot image 132 may nonetheless be particularly specific to, or customized for, the designated server 106. As a result, the desired booting and image capture operations associated with the operating system 128 and the designated server 106 may be executed in a reliable, efficient, optimized manner.

In the example of FIG. 1, the provisioning manager 102 is illustrated as executing on at least one computing device 138, which includes at least one processor 138a and a computer readable storage medium 138b. As may be appreciated, for example, code or other instructions for the provisioning manager 102 may be stored using the computer readable storage medium 138b, for execution thereof by the at least one processor 138a.

Of course, the illustrated example of FIG. 1 provides merely one of a few example implementations, and many other variations may be implemented, as well. For example, the at least one computing device 138 may be local to the data center 104, or may be remote therefrom. Moreover, it may be appreciated that virtually any single element of the system 100 may be implemented using two or more elements, while, conversely, any two or more elements may be combined for implementation by a single or reduced number of elements. For example, the provisioning manager 102 may be partially executed at a separate computing device, and/or using the designated server 106.

Moreover, it may be appreciated that various components of the system 100 may represent particular components or sub-components of a larger system or suite of software. For example, the pre-boot image generator 130 may be implemented as part of, or as a modification of, a larger suite of software which includes a number of different server management agents. Similarly, the provisioning manager 102 may be executed as part of a larger server management software suite, not specifically illustrated in the example of FIG. 1.

As described above, the system 100 of FIG. 1 may thus enable fast, efficient remote server management. In addition to the provisioning/re-provisioning, migration, and cloning operations described above, the system 100 may enable system back-up or restore functionality. Further, the system 100 may enable virtually any task that requires the OS 128 to be non-operational at a time of the task and yet be accessible by some external component.

Figure 2:
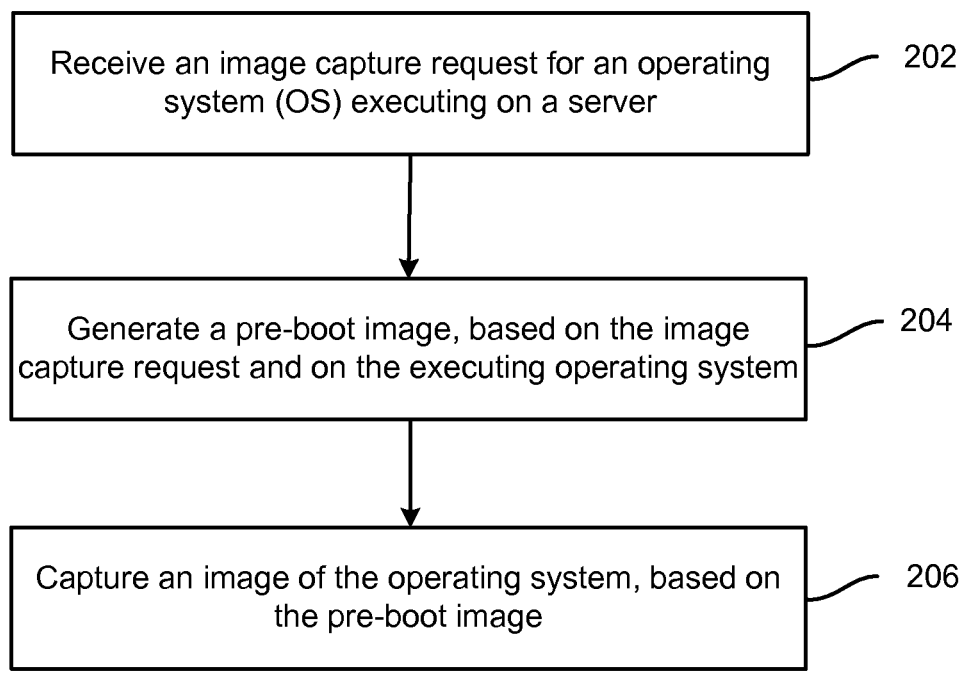
FIG. 2 is a flowchart illustrating example operations of the system of FIG. 1.

Additional or alternative functions and features of the system 100 of FIG. 1 are provided below, e.g., with respect to FIG. 2, which is a flowchart 200 illustrating example operations of the system 100 of FIG. 1. In the example of FIG. 2, operations 202-206 are illustrated as separate, sequential operations. However, it may be appreciated that the operations 202-206 may be executed in a partially or completely overlapping or parallel manner, or may execute in an order different than that shown. Moreover, the operations 202-206 each may include various sub-operations which may not be specifically illustrated or described herein. Further, such operations and/or sub-operations may execute in a nested, looped, or iterative fashion, and may include additional or alternative operations, and/or may omit one or more of the operations 202-206.

Thus, in the example of FIG. 2, an image capture request for an operating system (OS) executing on a server may be received (202). For example, as referenced above, the request handler 112 may receive such an image capture request for the image 114 of the designated server 106, to include at least an OS image of the operating system 128.

As is known, and as is referenced above, it is typically desirable to capture the image 114 at a time when the operating system 128 is inactive, and thus may require booting thereof. For example, while the operating system 128 is active, the operating system 128 may be presumed to be executing various read/write activities, and other normal aspects of such an operating system, which may be make it difficult or impossible to capture a static image of the operating system 128 (and associated images of the server software 122, including relevant applications executing on the operating system 128).

Nonetheless, in the example of FIG. 2, a pre-boot image may be generated, based on the image capture request and on the executing operating system (204). For example, the pre-boot image handler 116 may be configured to instruct the pre-boot image generator 130 at the designated server 106 to analyze the current execution of the executing operating system 128, e.g., using the analyzer 134, so as to thereby detect or otherwise determine particular components of the executing operating system 128 which should be included within the pre-boot image 132.

Consequently, an image of the operating system may be captured, based on the pre-boot image (206). For example, the image handler 118 may receive the image 114 from the pre-boot image generator 130, based on actions of the pre-boot image generator 130, including actions of the boot loader 124 as modified by the pre-boot image generator 130, as described in detail herein.

For example, as described below with respect to FIGS. 3 and 4, upon receipt of instruction from the pre-boot image handler 116 for generation of the pre-boot image 132 and associated booting and image capture operations, the pre-boot image generator 130 may cause the analyzer 134 to begin to actively monitor operations of the executing operating system 128, so as to thereby identify various components or aspects thereof for inclusion within the pre-boot image 132. The capture manager 136 may further populate the pre-boot image 132 with various capture components associated with the capture of the image 114.

Still further, the pre-boot image generator 130 may include an instruction or modification of the boot loader 124 which causes the boot loader 124 to boot the operating system 128 based on the pre-boot image 132, rather than the normal boot configuration 126. This instruction/modification for the boot loader 124 may specify utilization of the pre-boot image 132 in this manner only once, and to thereafter return to utilization of the normal boot configuration 126 during subsequent boot loading operations associated with booting the operating system 128.

In this way, as described herein, the pre-boot image generator 130 may dynamically construct the pre-boot image 132, and may simultaneously cause the boot loader 124, during and after a subsequent inactive state of the operating system 128 (e.g., during a network-initiated reboot thereof), to boot based on the pre-boot image 132 and to capture the image 114 for provision thereof to the provisioning manager 102. Subsequently, the server 106, including the boot loader 124, may thereafter boot and subsequently operate in an otherwise or normal, while nonetheless having captured the image 114.

Figure 3:
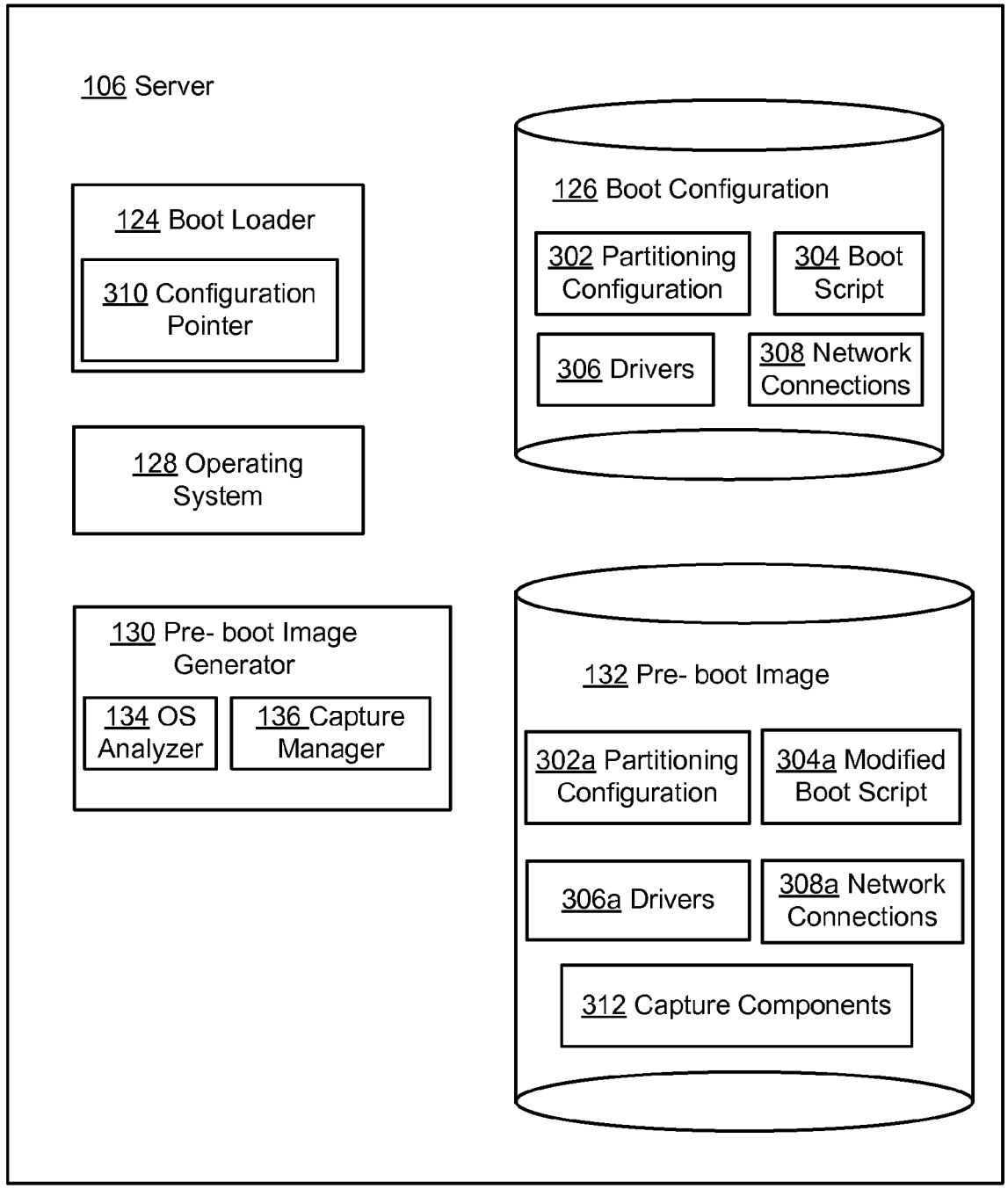
FIG. 3 is a block diagram illustrating a more detailed example of a server of the system of FIG. 1.

FIG. 3 is a block diagram of a more detailed example implementation of the server 106. In the example of FIG. 3, as referenced above with respect to FIG. 1, it is assumed that the server 106, during normal boot operations and other operations, includes a boot configuration file 126, which may be used by the boot loader 124 to perform normal boot operations for the operating system 128. For example, the boot configuration file 126 may include or represent an INitial RAM Disc (initrd) file which includes an initial script that executes during boot processes of the boot loader 124. By itself, such a boot configuration 126 is generally well known, and may include or be associated with, for example, a partitioning configuration 302, the previously-referenced boot script 304, one or more drivers 306, and one or more network connections 308.

Thus, during normal operations of the server 106, initiation of boot operations may cause the boot loader 124 to consult a configuration pointer 310 or other reference or link which identifies the boot configuration 126, which is then used to complete the standard boot operations. Consequently, the operating system 128, and thus other related software/hardware of the server 106, may actively execute in a conventional fashion.

During such conventional execution of the operating system 128 and related components, the pre-boot generator 130 may receive the instruction from the pre-boot handler 116 to dynamically construct the pre-boot image 132, as described above with respect to FIG. 1. Specifically, during active execution of the operating system 128 and related components, the analyzer 134 may examine the currently executing operations, and identify or otherwise determine therefrom specific components to be included within the pre-boot image 132, which will therefore be known to be suitable and appropriate for use thereof in booting the operating system 128.

Specifically, as shown, the analyzer 134 may determine a modified partitioning configuration 302a which may represent a subset or variation of the partitioning configuration 302. Similarly, the analyzer 134 may construct a modified boot script 304a, as well as a list of drivers 306a, any or all of which may represent one or more subsets or variations of corresponding elements 304, 306 of the standard boot configuration 126. Similar comments apply to the network connections 308, which are represented within the pre-boot image 132 by modified network connections 308a.

As part of related operations of the analyzer 134 in constructing the elements 302a-308a, the pre-boot generator 130 may modify the configuration pointer 310 to point to the pre-boot image 132, rather than to the boot configuration 126. Moreover, the pre-boot generator 130 may additionally instruct the configuration pointer 310, upon completion of booting of the operating system 128 based on the pre-boot image 132, to point again to the standard boot configuration 126. Consequently, it may be appreciated that, based on such modifications of the configuration pointer 310 by the pre-boot generator 130, a first booting of the operating system 128 by the provisioning manager 102 may result in booting of the operating system 128 based on the pre-boot image 132 that is dynamically constructed by the pre-boot generator 130, so that associated image capture operations may be performed (as described herein in detail). Meanwhile, second or subsequent boot operations of the server 106 may nonetheless proceed in an otherwise normal fashion, i.e., once the image 114 has successfully been captured.

Further with respect to FIG. 3, and as also referenced above, the pre-boot generator 130 may include a capture manager 136. As described, the capture manager 136, in conjunction with receipt of the image capture request from the pre-boot image handler 116 of the provisioning manager 102, may operate in conjunction with the analyzer 134 to construct the pre-boot image 132. Specifically, as illustrated, the capture manager 136 may insert desired or necessary capture components 312 into the pre-boot image 132, so that subsequent boot operations of the boot loader 134 with respect to the operating system 128 may proceed with the inclusion of otherwise conventional image capture operations associated with the capture and transmission of the image 114.

Thus, since the pre-boot image 132 is constructed using the server 106 itself, all device drivers required, e.g., for the detection of disk devices, file systems, and network cards will be present within the pre-boot image 132, and the pre-boot image 132 will thus be assured of booting on the server 106. Further, it may be appreciated that management of the pre-boot image 132 may be completely abstracted from the datacenter administrators, so that the administrators need not be concerned with managing and/or identifying a particular pre-boot image required for a particular type and configuration of server. Still further, the image capture techniques described herein are entirely scalable, because each server under capture is individual responsible for its own pre-booting, and need not have any dependency on another network image server (e.g., PXE server) to execute pre-booting operations.

Also, the pre-boot image 132 will include all the network card configurations of the server 106, so that when the server 106 is booted in a pre-boot environment, the server will use the same network card configuration(s). Consequently, any use of an external dynamic host configuration protocol (DHCP) server. Eliminating a need for the DHCP server may be advantageous, for example, if the datacenter 104 uses static Internet Protocol (IP) settings, so that there is no DHCP server running in the relevant environment.

Figure 4:
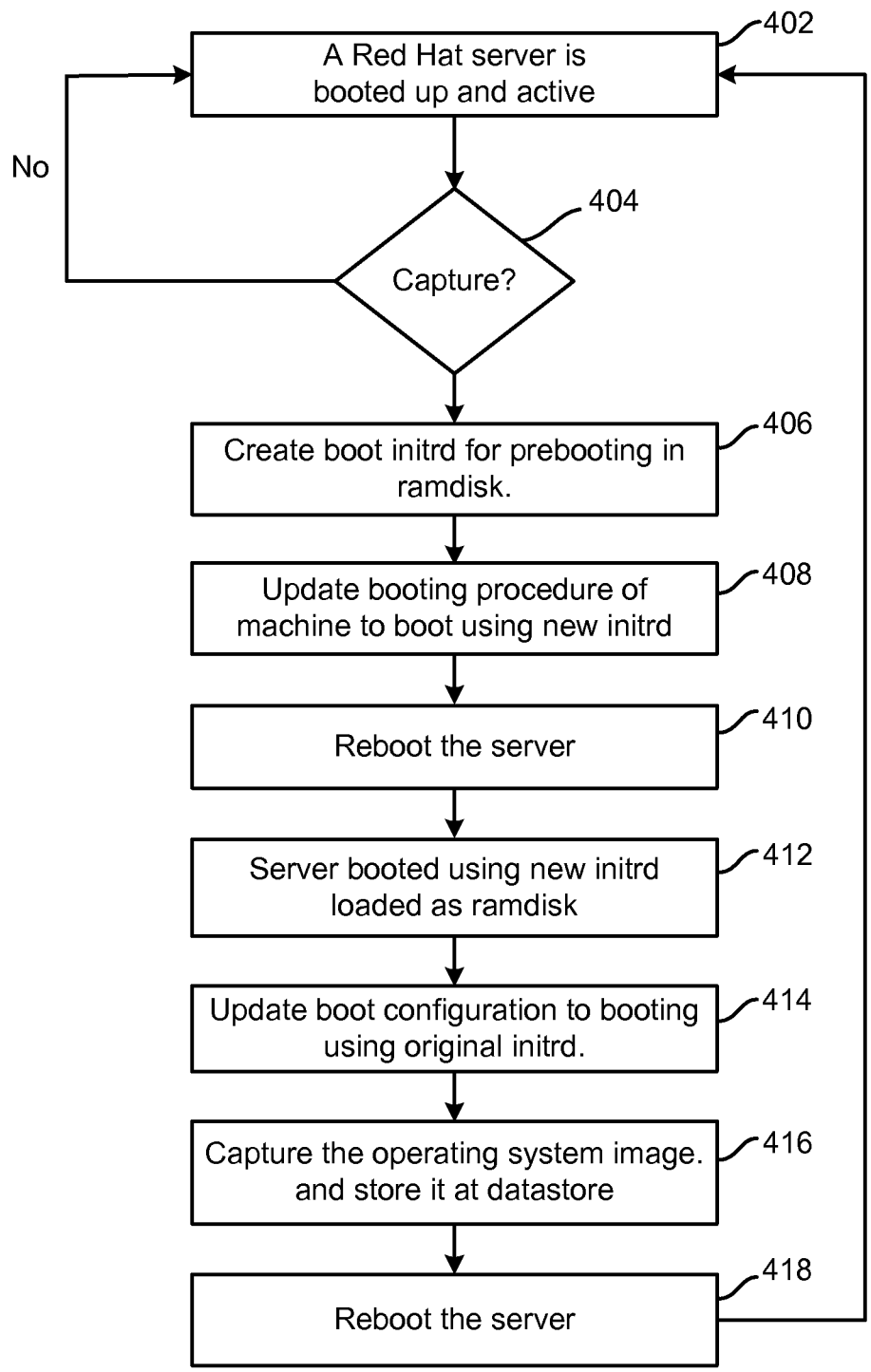
FIG. 4 is a flowchart illustrating more detailed example implementation of the systems of FIGS. 1 and 3.

FIG. 4 is a flowchart 400 illustrating example operations of the systems of FIGS. 1 and 3. In the example of FIG. 4, it is assumed that a server, e.g., server 106, is booted up and currently active (402), and is running, in the example, a Red Hat Linux operating system. As long as no image capture request is received (404), then such normal operations of the server may continue (402).

Upon receipt of the image capture request (404), a corresponding boot initrd file, e.g., the pre-boot image 132, may be created by the pre-boot image generator 130 for pre-booting into RAM of the server 106, including any necessary or desired capture components 312 (406). Further, a booting procedure, represented by the configuration pointer 310, may be updated so as to cause the server to subsequently boot using the new initrd file (408).

At this point, the command to initiate rebooting of the server may be executed (410), either directly by the pre-boot image generator 130 and/or indirectly via command received from the pre-boot handler 116 (410). As a result, the server may thus be booted using the new initrd file loaded into available RAM (412), e.g., using the pre-boot image 132.

As part of the thus-initiated boot operations, the boot configuration, e.g., the configuration pointer 310, may be updated to point to or otherwise reference an original initrd file, e.g., the boot configuration file 126 (414). As a result, during the boot operations which proceed utilizing the dynamically-constructed initrd file (e.g., the pre-boot image 132) and included capture components, the desired operating system image (e.g., the image 114) may be captured for subsequent storage at an appropriate local and/or remote data store (416), e.g., at or with the provisioning manager 102, as shown in FIG. 1.

Upon successful image capture, the server may be rebooted (418). As may be appreciated from the above description, such subsequent rebooting may utilize the current configuration pointer 310 which, as described, has been configured to reference the standard boot configuration 126. Consequently, the server may resume normal boot activities and other standard operations (402).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions recorded on a computer-readable medium and executable by at least one processor of a server, the system comprising:
    a request handler configured to receive an image capture request for an operating system (OS) executing on the server;
    a pre-boot image handler configured to analyze, at the server, the executing operating system of the server and generate a pre-boot image, based on the image capture request and on the executing operating system, the pre-boot image handler being further configured to cause the at least one processor to change an existing boot procedure of a boot configuration of the server to include the pre-boot image within a modified boot procedure; and
    an image handler configured to execute the modified boot procedure at the server to capture an image of the operating system.

2. The system of claim 1, wherein the request handler is executed using a management server that is remote from the server.

3. The system of claim 1, wherein the request handler is configured to receive the image capture request from a system administrator by way of a graphical user interface (GUI).

4. The system of claim 1, wherein the pre-boot image generator is configured to analyze the executing operating system to determine a subset of components of the boot configuration for the executing operating system, for inclusion thereof in the pre-boot image, based on a utility of the subset of components in booting the operating system.

5. The system of claim 1, wherein the pre-boot image generator is configured to include capture components within the pre-boot image which are configured to capture the image during execution of the modified boot procedure of the server using the pre-boot image.

6. The system of claim 1, wherein the pre-boot image generator is configured to execute the modified boot procedure including changing boot configuration settings to cause a reversion from the modified boot procedure back to the existing boot procedure of the boot configuration during an immediately-subsequent booting of the server.

7. The system of claim 1, wherein the pre-boot image is deleted from the server in conjunction with the capture of the image.

8. The system of claim 1, wherein the operating system is a Linux operating system.

9. A computer-implemented method, comprising:
    receiving an image capture request for an operating system (OS) executing on a server;
    generating a pre-boot image, based on the image capture request and on the executing operating system;
    changing a configuration pointer of a boot loader of the server to point from an existing boot configuration to the pre-boot image during a first re-booting of the server, to thereby create a modified boot procedure for the first re-booting, wherein the pre-boot image includes an instruction to change the configuration pointer from pointing to the pre-boot image back to the existing boot configuration during a second re-booting of the server;
    executing the first re-booting of the server including executing the modified boot procedure, including executing the pre-boot image and capturing an image of the operating system; and
    executing the second re-booting of the server including executing the existing boot configuration.

10. The method of claim 9, wherein generating the pre-boot image comprises instructing a pre-boot image generator implemented using the server to construct the pre-boot image.

11. The method of claim 10, wherein generating the pre-boot image comprises analyzing the executing operating system to determine a subset of components of the existing boot configuration for the executing operating system, for inclusion thereof in the pre-boot image and in the modified boot procedure, based on a utility of the subset of components in booting the operating system.

12. The method of claim 10, wherein generating the pre-boot image comprises including capture components within the pre-boot image which are configured to capture the image during the first re-booting of the server using the pre-boot image.

13. A computer program product, the computer program product being tangibly embodied on a non-transitory computer-readable medium and comprising instructions that, when executed, are configured to:
    receive an image capture request for an operating system (OS) executing on a server;
    generate a pre-boot image, based on the image capture request and on the executing operating system;
    change a configuration pointer of a boot loader of the server to point from an existing boot configuration to the pre-boot image during a first re-booting of the server, to thereby create a modified boot procedure for the first re-booting, wherein the pre-boot image includes an instruction to change the configuration pointer from pointing to the pre-boot image back to the existing boot configuration during a second re-booting of the server;
    execute the first re-booting of the server including executing the modified boot procedure, including executing the pre-boot image and capturing an image of the operating system; and
    execute the second re-booting of the server including executing the existing boot configuration.

14. The computer program product of claim 13, wherein the instructions, when executed, are configured to:
    analyze the executing operating system to determine a subset of components of the existing boot configuration for the executing operating system, for inclusion thereof in the pre-boot image, based on a utility of the subset of components in booting the operating system.

15. The computer program product of claim 13, wherein the instructions, when executed, are configured to:
    include capture components within the pre-boot image which are configured to capture the image during the first re-booting of the server using the pre-boot image.

16. The computer program product of claim 13, wherein the instructions, when executed, are configured to:

delete the pre-boot image from the server in conjunction with the capture of the image.

17. The system of claim 1, wherein the pre-boot image handler is configured to cause the at least one processor to change a configuration pointer of a boot loader of the server to point from the existing boot configuration to the pre-boot image to thereby execute the modified boot procedure.

\* \* \* \* \*